(12) United States Patent
Schaefer et al.

(10) Patent No.: US 6,640,210 B1
(45) Date of Patent: Oct. 28, 2003

(54) CUSTOMER SERVICE OPERATION USING WAV FILES

(76) Inventors: Frederick Anthony Schaefer, 545 Brandywine Dr., Colorado Springs, CO (US) 80906; Paul Michael Brashear, 4740 Grand Ave., South, Minneapolis, MN (US) 55409

( * ) Notice: Subject to any disclaimer, the term of this patent is extended or adjusted under 35 U.S.C. 154(b) by 206 days.

(21) Appl. No.: 09/596,488

(22) Filed: Jun. 19, 2000

Related U.S. Application Data
(60) Provisional application No. 60/165,257, filed on Nov. 12, 1999.

(51) Int. Cl.⁷ .............................................. G01L 21/00
(52) U.S. Cl. .................... 704/235; 704/270; 704/275; 379/88.01; 379/88.09; 379/87.1
(58) Field of Search .................... 704/235, 270, 704/275; 370/352, 356, 354; 705/1; 710/5; 709/217, 223, 201, 203; 379/88.14, 88.16, 88.17, 88.22, 88.09, 111, 67.1

(56) References Cited

U.S. PATENT DOCUMENTS

| | | | | |
|---|---|---|---|---|
| 5,721,827 A | * | 2/1998 | Logan et al. | 709/217 |
| 5,732,216 A | * | 3/1998 | Logan et al. | 709/203 |
| 5,867,495 A | * | 2/1999 | Elliott et al. | 370/352 |
| 6,199,076 B1 | * | 3/2001 | Logan et al. | 707/501 |
| 6,226,287 B1 | * | 5/2001 | Brady | 370/352 |
| 6,230,197 B1 | * | 5/2001 | Beck et al. | 709/223 |
| 6,269,336 B1 | * | 7/2001 | Ladd et al. | 704/270 |
| 6,311,231 B1 | * | 10/2001 | Bateman et al. | 710/5 |
| 6,337,858 B1 | * | 1/2002 | Petty et al. | 370/356 |
| 6,349,290 B1 | * | 2/2002 | Horowitz et al. | 705/35 |
| 6,359,881 B1 | * | 3/2002 | Gerszberg et al. | 370/354 |
| 6,370,508 B2 | * | 4/2002 | Beck et al. | 705/1 |
| 6,385,583 B1 | * | 5/2002 | Ladd et al. | 704/270 |
| 6,385,584 B1 | * | 5/2002 | McAllister et al. | 704/275 |

OTHER PUBLICATIONS http://www.zdnet.com/intweek, Interactive Week Online, Jun. 21, 1999, "Chat Rooms About To Turn Up Volume."
http://www.chicagotribune.com/tech/economy/ws/item/0,1308,37156-37160-37364.00,html, Chicago Tribune Internet Edition, Nov. 8, 1999, "On–line firms offer human touch," Michele Fitzpatrick.

http://www.latimes.com/print/front/19990929/t000087326.html, latimes, Sep. 29, 1999, "E–Bonding Via Voice on the Web," Charles Piller.

http://ww.zdnet.com/intweek/stories/news/0,4164,2346577,00.html, zdnet Interactive Week Online, Oct. 4, 1999, "HearMe: Talk Is Cheap On The Internet," Steven Vonder Haar.

http://www.sfgate.com/cgi-bin/article.cgi?file=/chronicle/archive/1999/11/18/BU43424.DTL, SF Gate, Nov. 18, 1999, "Look Who's Talking New Voice technology lets people "chat" out loud—online," Deborah Solomon.

http://www.zdnet.com/eweek/stories/general/0,11011,1015149,00.html, zdnet eWeek, Jun. 18, 1999, "New online meeting, voice services roll out Monday," Christa Degnan.

http://www.wired.com/news/technology/0,1282,20327,00.html, Wired News, Jun. 21, 1999, "Talkative Types Flock to Excite," Chris Oakes.

http://www.telecomlibrary.com/content/features/111799.webcall.html, Computer Telephony.com, Nov. 17, 1999, "Clicking With Customers–The Latest In Web–Enabled CallCenters."

http://www.zdnet.com/intweek/stories/news0,4164,2279508,00.html, zdnet Interactive Week Online, Jun. 22, 1999, "Chat Rooms About To Turn Up Volume," Kimberly Weisul.

\* cited by examiner

*Primary Examiner*—Susan McFadden
(74) *Attorney, Agent, or Firm*—Dale B. Halling

(57) ABSTRACT

A customer service center includes a server connected to a computer network. The server contains a speech recognition system. An operator station is capable of connecting to the server. A microphone is connected to the operator station. A codec is connected to the microphone and the operator station.

32 Claims, 4 Drawing Sheets

CUSTOMER SERVICE OPERATION USING WAV FILES

This application claims the benefit of Provisional Application Ser. No. 60/165,257 filed Nov. 12, 1999.

FIELD OF THE INVENTION

The present invention relates generally to the field of electronic customer service centers.

BACKGROUND OF THE INVENTION

The internet has caused an explosion in the number of business to consumer web sites and business to business web sites. These sites provide a number of advantages over traditional sales channels such as: salesmen, telephone orders and mail order. However, one significant limitation has been that customers cannot speak to a real person when they have a question. Some web sites have provided customers with a text chat feature. The customer clicks on an icon and is connected to a customer service representative in a text chat room. Unfortunately, this is a slow process and requires more time for the customer service representative to answer customer's questions. Another solution has been to provide the user with a telephone number. Unfortunately, most customers must sign off of the web site before they can place a telephone call. As a result, the consumer cannot view the web page while asking questions to the customer service representative.

Thus there exists a need for a method of operating a customer service center that can provide answers efficiently without the customer having to sign off of the web page.

DETAILED DESCRIPTION OF THE DRAWINGS

A customer service center includes a server connected to a computer network. The server contains a speech recognition system. An operator station is capable of connecting to the server. A microphone is connected to the operator station. A codec is connected to the microphone and the operator station. The system allows the customer service representative to voice a response to a customer's question. The speech recognition system converts the voiced response to a text response. The text response can be sent over the computer network. In addition, the voice response can be sent to the customer over the computer network. The voice response is encoded into a format that does not require the customer to have a plug-in to hear the voiced response. This system allows the operator to answer questions by voicing the answer. This increases the number of customers the customer service representative can help. The system also does not require the customer to log-off of the web site to get their question answered.

Figure 1:
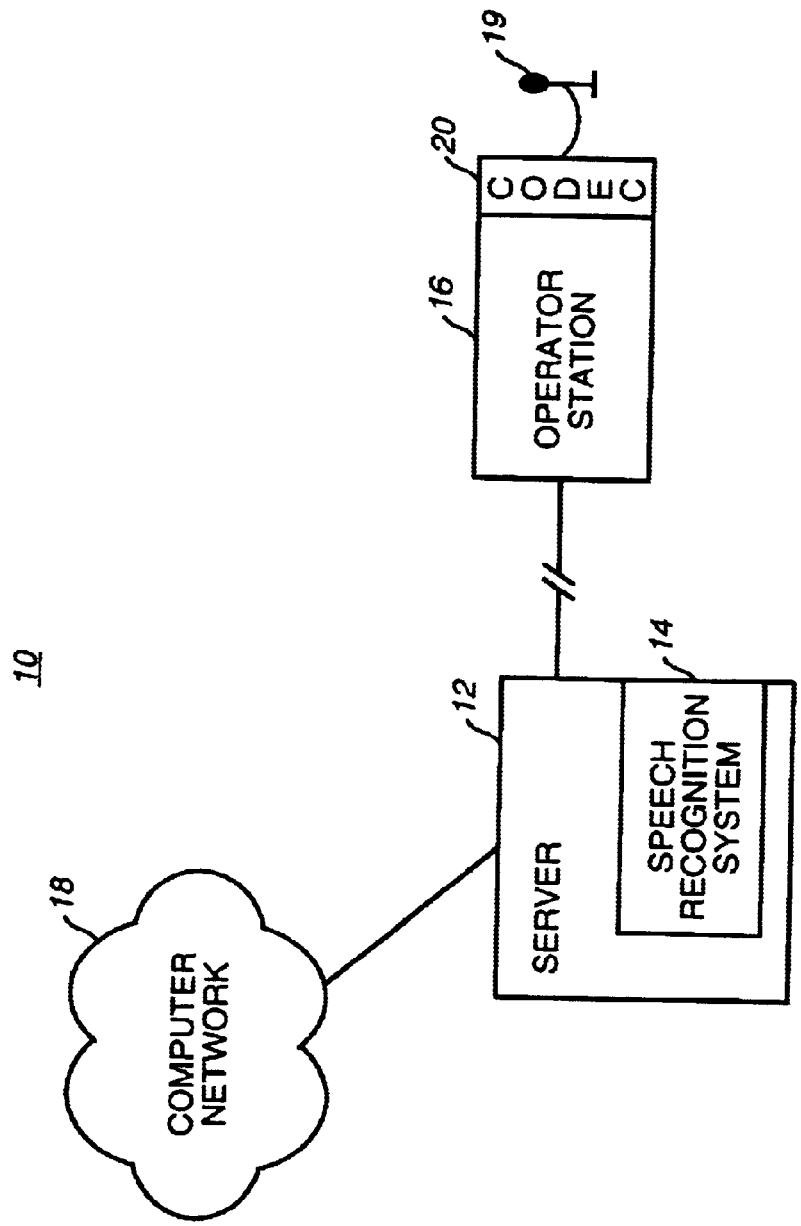
FIG. 1 is a block diagram of a customer service center system in accordance with one embodiment of the invention.

FIG. 1 is a block diagram of a customer service center system 10 in accordance with one embodiment of the invention. The customer service center system 10 has a server 12. The server 12 has a speech recognition system 14. An operator station 16 is capable of connecting to the server 12. The operator station 16 in one embodiment is always connected to the server 12. In another embodiment, the operator station 16 connects to the server 12 through the computer network 18. In yet another embodiment, the operator station 16 only connects to the server 12 when a customer query has been received by the server. This can significantly reduce telephone costs in countries where the telephone company charges for connections by the minute. A microphone 19 is connected to a codec 20 which is connected to the operator station 16.

Figure 2:
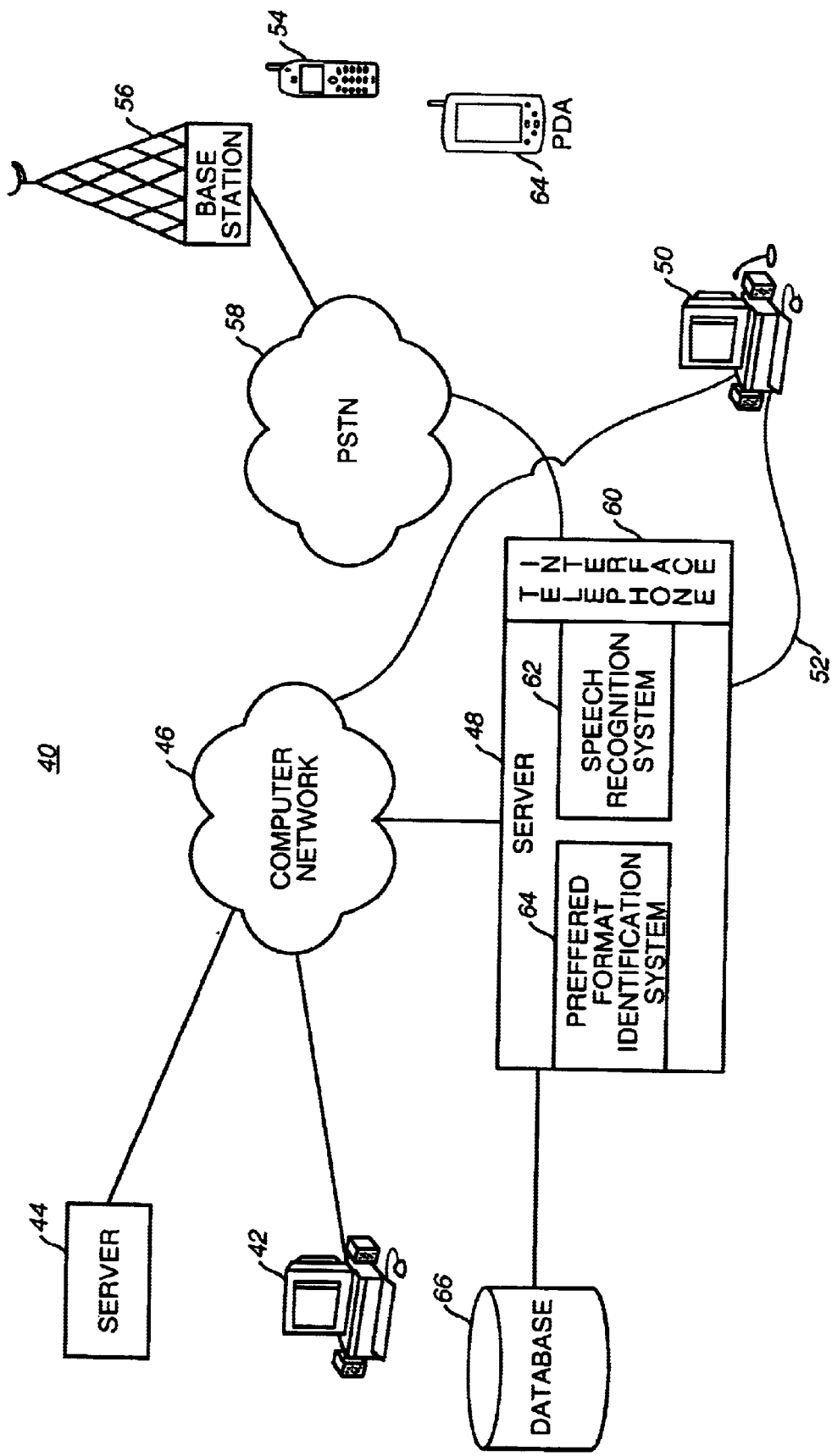
FIG. 2 is a block diagram of a customer service center system in accordance with one embodiment of the invention.

FIG. 2 is a block diagram of a customer service center system 40 in accordance with one embodiment of the invention. A customer computer 42 is connected with a retail web site 44 through a computer network (e.g., the Internet) 46. When a user clicks on an icon on the web page of the retail web site 44, they are connected with a server 48. The server 48 sends a standard introductory response to the customer. The customer can then type in a question. The question is forwarded to an operator station. In one embodiment, the operator station is a computer 50. The computer 50 can be directly 52 connected to the server 48 or the computer can be connected to the server 48 through a computer network 46. When the operator station is a computer, the computer may contain speech recognition software.

In another embodiment, the operator station is a cellular telephone 54. The cellular telephone 54 connects to the server through a base station 56. The base station 56 is connected to the public switched telephone network (PSTN) 58. The PSTN 58 is connected to the server 48 through a telephone interface 60. In this case the speech recognition system 62 in the server 48 is used. In another embodiment, the operator station is a personal digital assistant (PDA) 64. The operator may choose a "standard" or prerecorded response to a question. This is a significant time saving feature. When an operator selects a standard response, the response is accessed in a database 66 connected to the server 48. The database 66 may also keep copies of all responses by the operators.

The server 48, in one embodiment, includes a preferred format identification system 68. The preferred format identification system 68 determines the type of audio player the user has installed on his computer 48. Certain audio players come with particular operating systems. As a result most computers can play WAV files. The system 68 may examine header information to determine the browser type and operating system used by the requesters computer. In addition, the system 68 may send a query to the computer to determine the audio player type. The present embodiment of the system 40 uses a GSM (Global System for Mobile communications) format when possible. Note that by determining the type of audio player on the users computer 42, the system does not need software plug-ins to send audio to the user's computer 42.

In one embodiment, the user emails a question to the customer service center server 48. The text response created as above and encapsulated into an email and sent to the user computer 42.

Figure 3:
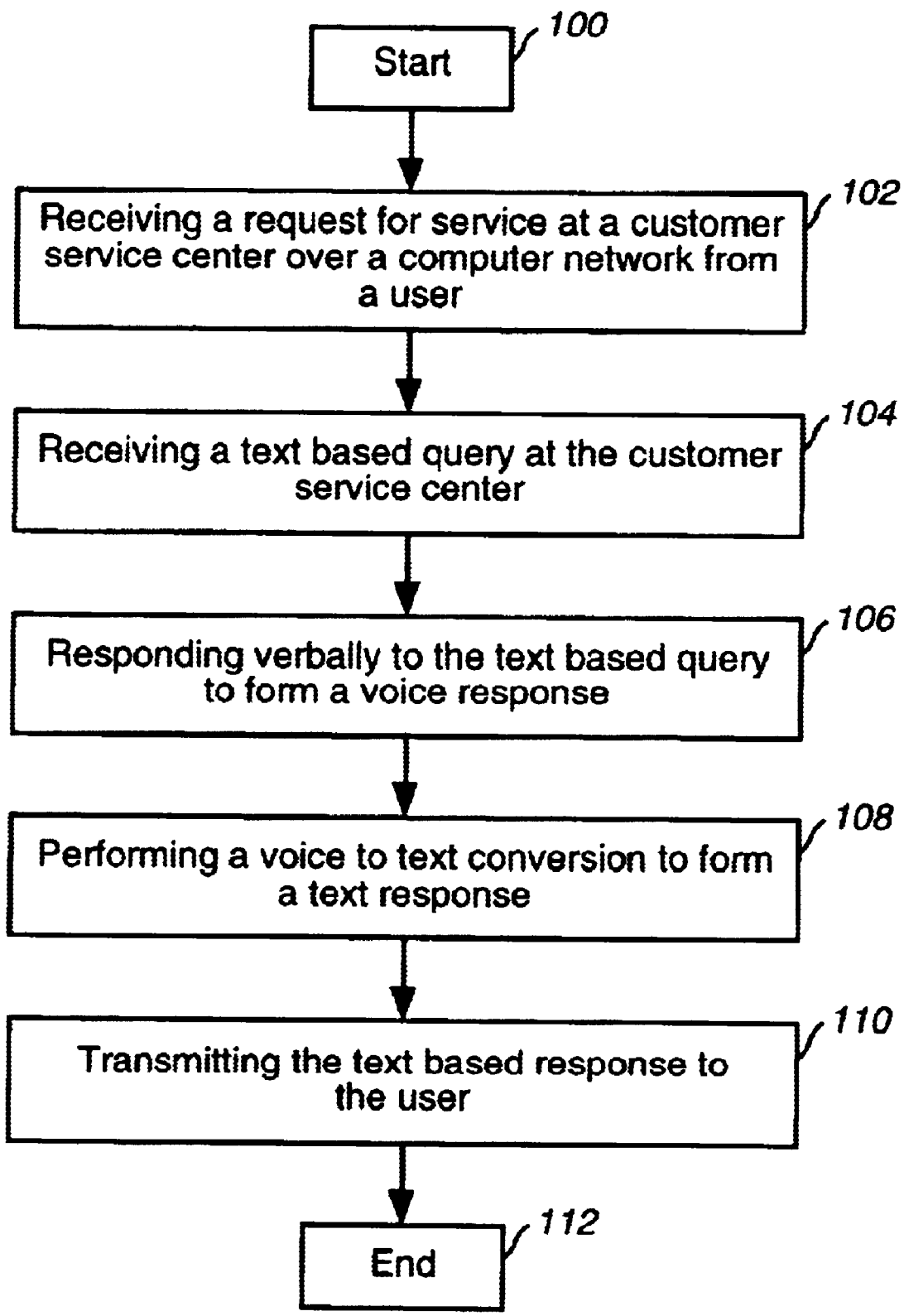
FIG. 3 is a flow chart of the steps used in a method of operating a customer service center in accordance with one embodiment of the invention.

FIG. 3 is a flow chart of the steps used in a method of operating a customer service center in accordance with one embodiment of the invention. The process starts, step 100, by receiving a request for service at a customer service center over a computer network from a user at step 102. A text based query is received at the customer service center at step 104. A verbal response to the text based query is formed at step 106. A voice to text conversion is performed to form a text response at step 108. At step 110, the text based response is transmitted to the user which ends the process at step 112. In one embodiment, a voice based response is transmitted to the user. In one embodiment, a message is sent asking the user if the speakers are on at his computer. When the answer is yes the voice base response is sent to the user.

In one embodiment, an introductory response is sent to user as soon as the server receives the request. The introductory response may explain how the service works and request the user type a question.

The user initiates the service by clicking on a customer service icon on a web page. The requesting computer is then connected to the server at the customer service center. The server then selects one of the plurality of customer service stations to receive the user's questions.

In one embodiment, the server determines a type of browser on the requesting computer. The server may also determine an operating system of the requesting computer. The server or computer operator station converts the voice response from an operator into a format compatible with the browser of the requesting computer. In one embodiment, the server converts the voice response into a GSM format. In one embodiment, the operator is presented with the text response and can edit the response before transmission to the user.

In one embodiment, the operator station is a cellular telephone. In another embodiment, the operator station is a personal digital assistant. In one embodiment, the operator station is not always connected to the server. In this case a signal is sent to the operator station. The operator station then connects to the server at the customer service station. When the connection involves a telephone line (voice channel) in a country that charges by the minute for local calls, this feature can significantly reduce the operating cost of the customer service center.

Figure 4:
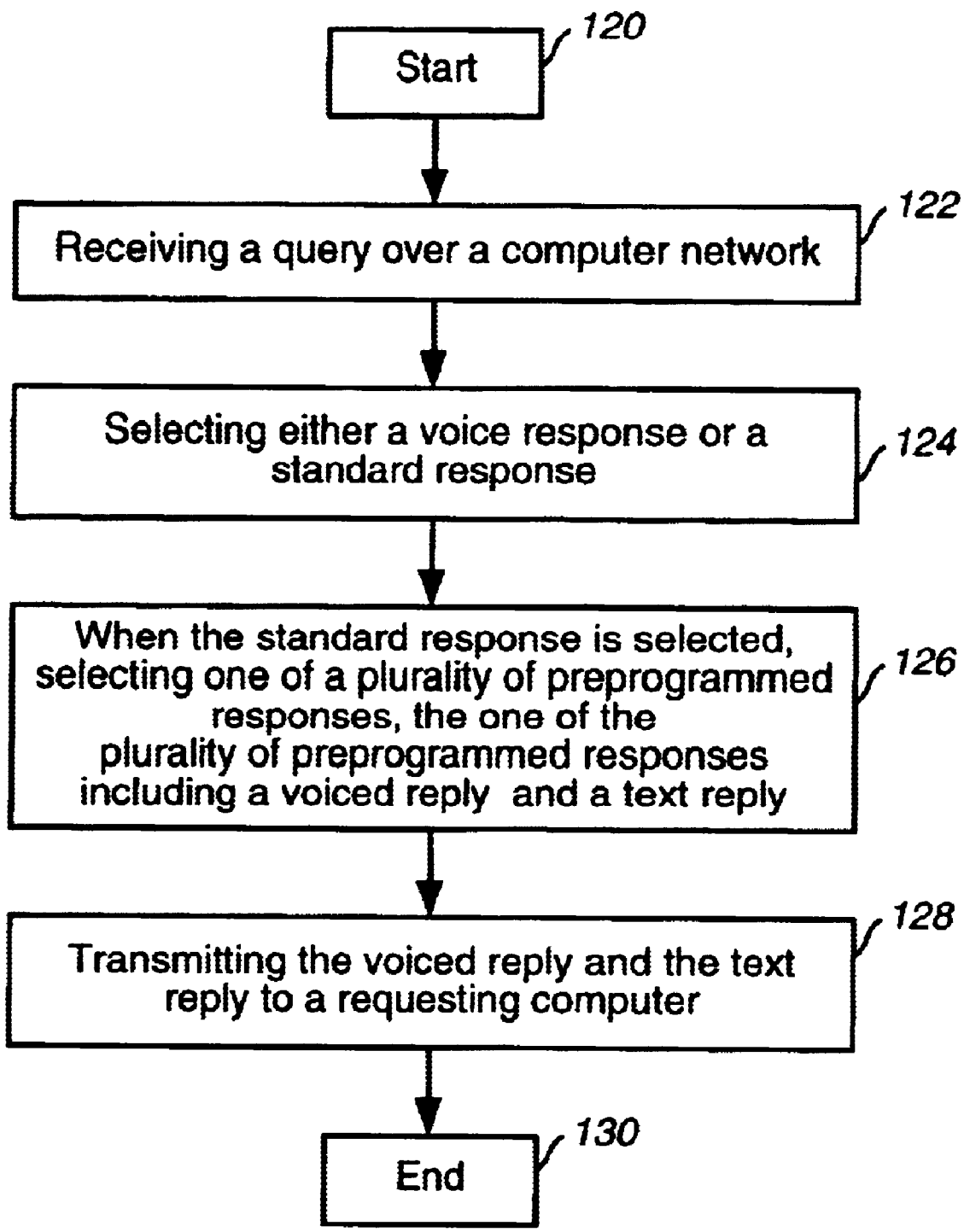
FIG. 4 is a flow chart of the steps used in a method of operating a customer service center in accordance with one embodiment of the invention.

FIG. 4 is a flow chart of the steps used in a method of operating a customer service center in accordance with one embodiment of the invention. The process starts, step 120, by receiving a query over a computer network at step 122. Either a voice response or a standard response is selected by the operator at step 124. When the standard response is selected, one of a plurality of preprogrammed response is selected at step 126. The plurality of preprogrammed responses include a voiced reply and a text reply. At step 128, the text reply and the voice reply are transmitted to a requesting computer which ends the process at step 130. When a voice response is selected, a voiced statement is formed. The voiced statement is converted into a text statement. The text statement is transmitted to the requesting computer.

In one embodiment it is determined if a speaker of a user computer is on. When the speaker is on, the voiced statement is sent to the user. The voiced statement is converted into a digital format.

In one embodiment, an icon is placed on a web page. When the user clicks on the icon they are connected to the customer service center. The server at the customer service center selects one of a plurality of operator station to receive a question. In one embodiment a signal is transmitted to one of the plurality of operator stations. The one of the plurality of operator stations then connects to the server.

In one embodiment, the customer computer includes a codec and the user transmits an audio query over the computer network. In one embodiment, the operator's voiced statement and the text statement are stored on a database. These statements can be mined to determine frequent problems.

Thus there has been described a system and method of operating a customer service center that can efficiently respond to customer's questions. In addition, the system does not require the user to sign off of their computer to speak to a customer service representative.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of operating a customer service center, comprising the steps of:
   a) receiving a request for service at a customer service center over a computer network from a user;
   b) receiving a text based query at the customer service center;
   c) responding verbally to the text based query to form a voice response in a WAV format;
   d) performing a voice to text conversion to form a text response at customer service center; and
   e) transmitting the text based response and voice based response to the user over the computer network.

2. The method of claim 1, wherein step (b) further includes the steps of:
   b1) sending a signal to an operator computer;
   b2) connecting the operator computer to a server at the customer service center.

3. The method of claim 1, wherein step (a) further includes the step of:
   a1) transmitting an introductory response to the user.

4. The method of claim 3, wherein step (a1) further includes the step of:
   i) transmitting a message asking the user if a speaker is on.

5. The method of claim 1, wherein step (a) further includes the steps of:
   a1) clicking on a customer service icon on a web page by a user;
   a2) connecting a requesting computer to a server at the customer service center.

6. The method of claim 1, wherein step (a) further includes the step of:
   a1) selecting one of a plurality of customer service stations.

7. The method of claim 1, wherein step (a) further includes the step of:
   a1) determining a type of browser on a requesting computer.

8. The method of claim 1, wherein step (a) further includes the step of:
   a1) determining an operating system on a requesting computer.

9. The method of claim 1, wherein step (c) further includes the step of:
   c1) converting the voice response to a format compatible with a browser of a requesting computer.

10. The method of claim 1, wherein step (c) further includes the step of:

c1) converting the voice response into a GSM format.

11. The method of claim 1, wherein step (d) further includes the steps of:

d1) presenting the text response to an operator;

d2) editing the text response.

12. The method of claim 1, wherein step (b) further includes the step of:

b1) forwarding the query to a cellular telephone.

13. The method of claim 1, wherein step (b) further includes the step of:

b1) forwarding the query to a personal digital assistant.

14. A customer service center, comprising:

a server connected to a computer network containing a speech recognition system;

a preferred format identification system used to determine if an audio player is WAV compatible, capable of operating on the server, the preferred format identification system providing an audio response in a WAV format when the audio player is WAV compatible;

an operator station capable of connecting to the server;

a microphone connected to the operator station; and a codec connected to the microphone and the operator station.

15. The customer service center of claim 14, wherein the operator station provides a plurality of standard responses.

16. The customer service center of claim 14, further including:

a database connected to the server contain a plurality of preprogrammed responses.

17. The customer service center of claim 14, wherein the plurality of preprogrammed responses includes a plurality of voiced responses and a plurality of text responses.

18. The customer service center of claim 14, wherein the operator station is a computer.

19. The customer service center of claim 14, wherein the operator station is a digital cellular telephone.

20. The customer service center of claim 14, wherein the operator station is a personal digital assistant.

21. The customer service center of claim 14, wherein the codec converts a voice input into a GSM format.

22. A method of operating a customer service center, comprising the steps of:

a) receiving a query over a computer network;

b) selecting either a voice response or a standard response;

c) when the standard response is selected, selecting one of a plurality of preprogrammed responses, the one of the plurality of preprogrammed responses including a voiced reply and a text reply;

d) transmitting the voiced reply and the text reply to a requesting computer over the computer network; and e) playing the voice based response at a user computer without requiring a software plug-in.

23. The method of claim 22, wherein step (a) further includes the step of:

a1) determining if a requesting computer speakers are on.

24. The method of claim 22, wherein step (a) further includes the step of:

a1) receiving an audio query from a user over the computer network.

25. The method of claim 22, further including the steps of:

f) when the voice response is selected, voicing a voiced statement;

g) converting the voiced statement into a text statement;

h) transmitting the text statement to the requesting computer.

26. The method of claim 25, further including the steps of:

i) determining if a speaker of a user computer are on;

j) when the speaker is on, transmitting the voiced statement.

27. The method of claim 25, further including the step of:

i) storing the voiced statement in a database.

28. The method of claim 25, further including the step of:

i) storing the text statement in a database.

29. The method of claim 22, wherein step (b) further includes the steps of:

b1) selecting one of a plurality of operator stations;

b2) transmitting the query to the one of the plurality of operator stations.

30. The method of claim 29, wherein step (b1) further includes the step of:

i) transmitting a signal to the one of the plurality of operator stations;

ii) connecting the one of the plurality of operator stations to a server.

31. The method of claim 22, wherein step (f) further includes the step of:

f1) converting the voiced statement into a digital format.

32. The method of claim 22, wherein step (a) further includes the steps of:

a1) placing an icon on a web page;

a2) clicking on the icon.

* * * * *